(12) United States Patent
Dhruva et al.

(10) Patent No.: US 10,929,511 B2
(45) Date of Patent: Feb. 23, 2021

(54) SYSTEMS AND METHODS FOR PROTECTING SENSITIVE INFORMATION

(71) Applicant: Facebook, Inc., Menlo Park, CA (US)

(72) Inventors: Rohan B. Dhruva, Mountain View, CA (US); Aarati Vijay Soman, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 381 days.

(21) Appl. No.: 15/832,152

(22) Filed: Dec. 5, 2017

(65) Prior Publication Data

US 2019/0171794 A1    Jun. 6, 2019

(51) Int. Cl.
| | |
|---|---|
| *G06F 21/10* | (2013.01) |
| *H04L 29/08* | (2006.01) |
| *G06F 21/60* | (2013.01) |
| *G06Q 50/00* | (2012.01) |
| *G06F 21/62* | (2013.01) |

(52) U.S. Cl.
CPC ............. *G06F 21/10* (2013.01); *G06F 21/60* (2013.01); *G06F 21/6245* (2013.01); *G06Q 50/01* (2013.01); *H04L 67/22* (2013.01); *H04L 67/306* (2013.01)

(58) Field of Classification Search
CPC ....... G06F 21/10; G06F 21/60; G06F 21/6245
See application file for complete search history.

(56) References Cited

U.S. PATENT DOCUMENTS

| | | | | |
|---|---|---|---|---|
| 5,881,287 | A * | 3/1999 | Mast | G06F 21/10 705/57 |
| 6,922,693 | B1 * | 7/2005 | Rubin | G06F 17/211 |
| 7,600,267 | B2 * | 10/2009 | Bauchot | G06F 21/84 726/33 |
| 8,904,473 | B2 * | 12/2014 | Sambamurthy | G06F 21/554 726/1 |
| 9,672,373 | B2 * | 6/2017 | Griffith | G06F 21/6209 |
| 2004/0054630 | A1 * | 3/2004 | Ginter | G06F 21/10 705/53 |
| 2011/0004831 | A1 * | 1/2011 | Steinberg | H04L 65/403 715/753 |
| 2012/0150863 | A1 * | 6/2012 | Fish | G06Q 10/101 707/741 |
| 2012/0233671 | A1 * | 9/2012 | Beder | G06F 21/6227 726/4 |
| 2012/0293537 | A1 * | 11/2012 | Takami | G06F 21/10 345/589 |
| 2013/0246039 | A1 * | 9/2013 | Duneau | G09G 5/40 704/2 |
| 2014/0006395 | A1 * | 1/2014 | Wolfe | G06F 16/5866 707/732 |
| 2014/0090055 | A1 * | 3/2014 | Palumbo | H04L 63/145 726/22 |
| 2014/0359140 | A1 * | 12/2014 | Shankarraman | H04L 65/601 709/227 |
| 2017/0017700 | A1 * | 1/2017 | Mehrotra | H04L 67/22 |
| 2017/0264614 | A1 * | 9/2017 | Huang | H04W 12/0802 |
| 2018/0091728 | A1 * | 3/2018 | Brown | H04N 5/91 |

* cited by examiner

*Primary Examiner* — Vance M Little
(74) *Attorney, Agent, or Firm* — Sheppard Mullin Richter & Hampton LLP

(57) ABSTRACT

Systems, methods, and non-transitory computer readable media can detect an event relating to a copy of a content item. A determination can be made that the content item is associated with sensitive information. The copy of the content item can be modified.

20 Claims, 9 Drawing Sheets

550

Eliminate access to a copy of a content item
552

Provide access to a modified copy of the content item
554

SYSTEMS AND METHODS FOR PROTECTING SENSITIVE INFORMATION

FIELD OF THE INVENTION

The present technology relates to the field of social networks. More particularly, the present technology relates to computer networking techniques for dynamically generating protections for sensitive information associated with content.

BACKGROUND

Today, people often utilize computing devices or systems for a wide variety of purposes. Users can use their computing devices, for example, to interact with one another, create content, share content, and view content. In some cases, a user can utilize his or her computing device to access a social networking system or service. The user can provide, post, share, and access various content items, such as status updates, images, videos, articles, and links, via the social networking system.

A social networking system may provide resources through which users may publish content items. In one example, a content item can be presented on a profile page of a user. As another example, a content item can be presented through a feed for a user to access. A content item to be presented through a social networking system can contain sensitive information.

SUMMARY

Various embodiments of the present technology can include systems, methods, and non-transitory computer readable media configured to detect an event relating to a copy of a content item. A determination can be made that the content item is associated with sensitive information. The copy of the content item can be modified.

In some embodiments, the event is generation of a screenshot of a user interface presenting the content item.

In some embodiments, the content item is associated with metadata indicating a presence of the sensitive information.

In some embodiments, the metadata further indicates a location of the sensitive information in the content item.

In some embodiments, the detection of an event comprises determining that the content item was presented in a user interface at a time of the event.

In some embodiments, the copy of the content item is overwritten in memory with the modified copy.

In some embodiments, the event is generation of a screenshot of a user interface presenting the content item. The modification of the copy of the content item comprises obscuring at least a portion of the screenshot.

In some embodiments, the portion of the screenshot includes the sensitive information.

In some embodiments, access to the copy of the content item is eliminated. Access to the modified copy of the content item is permitted.

In some embodiments, the modification of the copy of the content item is based on an opt in by an owner of the content item.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
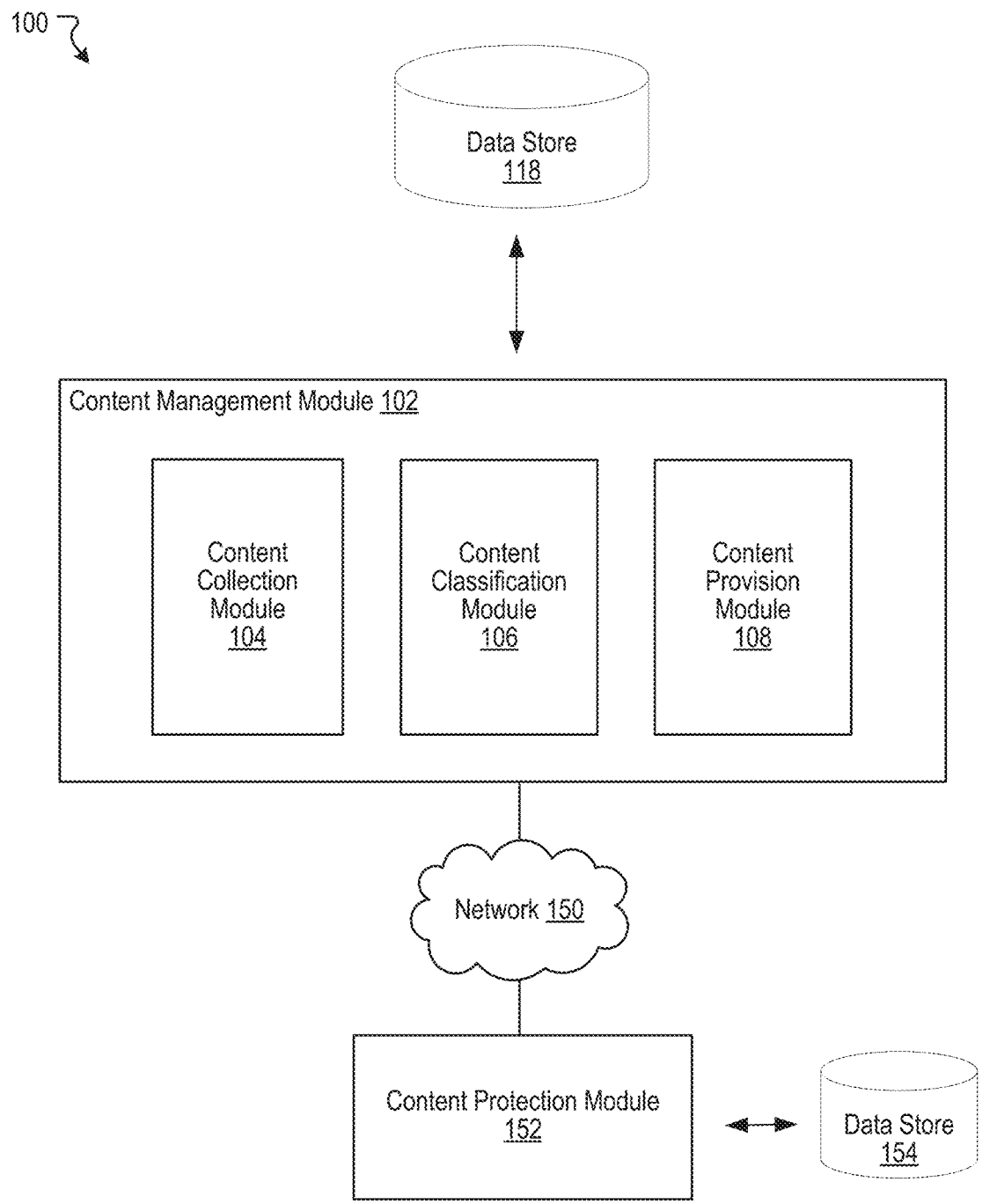
FIG. 1 illustrates an example system including an example content management module and an example content protection module configured to protect sensitive information, according to an embodiment of the present technology.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Protecting Sensitive Information in Content Items

People use computing devices or systems for a wide variety of purposes. Computing devices can provide different kinds of functionality. Users can utilize their computing devices to produce information, access information, and share information. In some cases, users can utilize computing devices to interact or engage with a social networking system. A social networking system may provide resources through which users may publish content items. In one example, a content item can be presented on a profile page of a user. As another example, a content item can be presented through a feed for a user to access. A content item to be presented through a social networking system can contain sensitive information.

Conventional approaches specifically arising in the realm of computer technology can involve publication of content items on behalf of their owners through a content platform, such as a social networking system. The content items can contain various types of sensitive information, such as depictions of persons, indications of personal information, references to financial data, or other types of protected data. As content items reflecting sensitive information are published across a social networking system for possible access by millions or more users, the potential for abuse of the content items can arise. In some instances, the content items, including their sensitive information, can be electronically copied and exploited as part of online activities that are not consistent with the intent of their owners. For example, after a content item depicting its owner is published, the content item can be stolen by another user through an unpermitted act of electronically copying the content item. The copied content item can be altered or otherwise manipulated in a manner that is inconsistent with the intent or interests of the owner. As just one example, the content item can be manipulated to include scandalous or false information to attack, defame, shame, harass, or otherwise harm the owner or their character. Online publication and propagation of the content item after such manipulation can quickly multiply harm to the owner.

An improved approach rooted in computer technology can overcome the foregoing and other disadvantages associated with conventional approaches specifically arising in the realm of computer technology. Based on computer technology, the disclosed technology can collect content items of an owner that are intended for online publication through a content platform, such as a social networking system. An owner of content items can be provided with an ability to opt in to protecting sensitive information that is reflected in or otherwise associated with the content items. When the owner opts in, the content items of the owner can be analyzed to identify which content items, if any, are associated with sensitive information. For example, the identification can be based on machine learning models trained to identify the sensitive information. As just one example, the sensitive information can include a personal profile picture. When a content item is determined to be associated with sensitive information, metadata associated with the content item can be generated to indicate that the content item is associated with sensitive information. For example, a tag associated with the content item can be generated as such an indication. The social networking system can provide content items, along with their metadata, for presentation on a computing device of a user. When generation of a copy of a content item is detected on the computing device of the user, it can be determined through metadata associated with the content item whether the content item is associated with sensitive information. If the content item is associated with sensitive information, the copy of the content item can be modified so that the sensitive information is obscured or eliminated. Because the sensitive information of the content item is not discernible, harm to the owner through potential misuse of the copy of the content item can be avoided. Additional details relating to the disclosed technology are provided below.

FIG. 1 illustrates an example system 100 to protect sensitive information appearing in or otherwise associated with content items, according to an embodiment of the present technology. The system 100 can identify content items of an owner that are associated with sensitive information. When generation of a copy of a content item containing sensitive information is detected on a user device (or client computing device), the system 100 can automatically modify the copy. The copy can be modified by obscuring or eliminating the sensitive information. The system 100 can overwrite on the user device the copy in its original form and replace it with the copy as modified. Accordingly, with the sensitive information obscured or removed, the system 100 can prevent attempts through the user device to manipulate and republish the content item to harm its owner. As used herein, a content item can include, for example, any one or combination of an image, video, audio, text, etc. As just one example, a content item can be a personal profile picture depicting an owner of the profile picture. Sensitive information can include, for example, a full or partial depiction of a person (e.g., a face), identifying information about a person (e.g., a name), personal information about a person (e.g., a phone number), financial information of a person (e.g., a credit card number), and any other types of protected data. Sensitive information can also include such information as it relates to other types of entities apart from persons. While examples relating to sensitive information appearing in a content item are discussed herein, the present technology applies also to sensitive information otherwise associated with a content item. Further, while examples discussed herein relate to appearance of visual sensitive information, the present technology also can apply to other types of sensitive information, such as audible sensitive information. In some embodiments, an owner of content items associated with sensitive information can opt in to protections for the sensitive information provided by the present technology.

The system 100 includes a content management module 102 and a content protection module 152 communicatively coupled through a network 150. The content management module 102 is coupled to a data store 118 and the content protection module 152 is coupled to a data store 154. In some embodiments, the content protection module 102 can be implemented in a server system, such as a social networking system 630, while the content protection module 152 can be implemented in a user device (or client computing device), such as a user device 610, as discussed in more detail herein. In some embodiments, the network 150 can be implemented as a network 650, as discussed in more detail herein. The components (e.g., modules, elements, steps, blocks, data stores, etc.) shown in this figure and all figures herein are exemplary only, and other implementations may include additional, fewer, integrated, or different components. Some components may not be shown so as not to obscure relevant details. In various embodiments, one or more of the functionalities described in connection with the content management module 102 and the content protection module 152 can be implemented in any suitable combinations. While the disclosed technology is described in connection with content items published through a computerized social networking system for illustrative purposes, the disclosed technology can apply to any other type of online or networked system and any other type of content management platform.

The content collection module 104 can obtain content items that are to be published through a system, such as a social networking system. For example, the content collection module 104 can obtain a content item that has been uploaded or otherwise provided by its owner for publication through the social networking system. Upon provision to the social networking system, the content item can be published in various platforms, surfaces, or feeds of the social networking system. For example, the content item can be published to a profile page dedicated to the owner. As another example, the content item can appear in one or more feeds of connections of the owner. As yet another example, the content item can be presented in a collection of other content items of the owner or others that are accessible for only a limited duration of time. Many variations are possible in relation to publication of the content item through a social networking system.

The content classification module 106 can determine whether a content item contains or is otherwise associated with sensitive information. In some embodiments, the content classification module 106 can make this determination before publication of the content item through a social networking system. The content classification module 106 can determine the presence of sensitive information in connection with a content item based on satisfaction of predetermined criteria. The predetermined criteria can relate to any information selected to reliably indicate a presence of sensitive information warranting protection. In some embodiments, with respect to an image, the predetermined criteria can require satisfaction of all of the following: 1) the content item includes depiction of a face of a person in the image, 2) the person is not a celebrity, and 3) no writing appears in the image. A celebrity can include, for example, a famous person, a public figure, a prominent individual, and the like. In other embodiments, the predetermined criteria can require satisfaction of only one or two of the three criteria identified above. In still other embodiments, other predetermined criteria can be utilized.

The content classification module 106 can determine satisfaction of predetermined criteria relating to a presence of sensitive information associated with a content item. In some embodiments, the content classification module 106 can utilize one or more conventional machine learning techniques or other known approaches. For example, a machine learning model can be a classifier that is trained to identify or recognize information relevant to satisfaction of predetermined criteria. In an evaluation phase, a content item can be provided to the machine learning model and the machine learning model can generate an output, such as a score. When the output of the machine learning model satisfies a selected threshold value, the content classification module 106 can determine the existence of the information relevant to satisfaction of predetermined criteria. In some embodiments, the machine learning model also can provide a location of such relevant information in the content item. For example, the machine learning model can generate coordinates or coordinate ranges describing a location of the relevant information (e.g., a face) based on a coordinate system that is defined relative to dimensions or boundaries of the content item.

As referenced above, in certain embodiments, predetermined criteria can require, with respect to an image, that the content item includes depiction of a face of a person in the image, the person is not a celebrity, and no writing appears in the image. In these embodiments, the content classification module 106 can determine whether the predetermined criteria are satisfied in a various manners. For example, in these embodiments, the content classification module 106 can utilize conventional techniques based on machine learning models to detect a presence or absence of a face in a content item, such as an image. In some embodiments, a machine learning model can be appropriately trained to recognize objects in a content item and to provide a score relating to a probability of whether a recognized object is a face. In this embodiment, when the score satisfies a selected threshold, the content classification module 106 can determine the presence of a face in the content item. Further, as discussed above, the content classification module 106 can determine a location of the face in the content item based on generation of the location by the machine learning model.

As another example in these embodiments, the content classification module 106 can utilize conventional techniques based on machine learning models to determine a presence or absence of a celebrity depicted in a content item, such as an image. In some embodiments, a machine learning model can be trained to generate representations of content items in which a person (e.g., face) has been recognized. For example, a representation can include a set of features, such as a feature vector, that is descriptive of the content item or the recognized person. The content classification module 106 can generate a plot of content items in an n-dimensional feature space based on feature vectors. Any generally known approach for clustering data can be applied to the plot, such as k-means clustering. In many cases, because content items depicting celebrities are more frequently received by a social networking system than content items depicting non-celebrities, a plot of a large number of content items received by the social networking system can exhibit clusters associated with celebrities. When a new content item that is plotted in the feature space falls inside a cluster associated with a celebrity, the content classification module 106 can determine that the content item depicts a celebrity. Similarly, when a new content item that is plotted in the feature space falls outside a cluster associated with a celebrity, the content classification module 106 can determine that the content item does not depict a celebrity. Many variations are possible.

As yet another example in these embodiments, the content classification module 106 can utilize conventional techniques to identify a presence or absence of writing in a content item, such as an image. In some embodiments, the content classification module 106 can employ one or more machine learning models trained to recognize writing in a content item. In other embodiments, the content classification module 106 can utilize one or more known text detection processes, which can include, for example, utilization of a conventional algorithm to detect MSERs and a conventional OCR technique. Many variations are possible.

The content classification module 106 can generate metadata associated with a content item upon determining that predetermined criteria relating to the presence of sensitive information associated with the content item have been satisfied. The metadata associated with the content item can indicate the presence of sensitive information depicted in or otherwise associated with the content item. In some embodiments, the metadata can include, for example, a tag of the content item that indicates the presence of sensitive information. In some embodiments, the metadata also can include information indicating a location of the sensitive information in the content item.

The content provision module 108 can provide content items, along with their metadata, for presentation to users of a social networking system. In some embodiments, the content items can be presented through an application of the social networking system running on user devices of the users. In some embodiments, content items can be selectively provided to the users based on various attributes of the content items and potential interest of the users in the content items. As referenced, content items can be presented to users in various platforms, surfaces, or feeds of the social networking system. In some embodiments, when an owner of a content item associated with sensitive information, such as a personal profile picture, has opted in to the present technology, users who are presented with the content item (e.g., connections of the owner) can receive a related notification. For example, the notification can indicate that the content item and associated sensitive information are protected by the present technology. In addition, the content item can be presented with a visual reference (e.g., a shield icon, a guard icon, etc.) indicating that the content item and its sensitive information are protected.

The data store 118 can be configured to store and maintain various types of data, such as the data relating to support of and operation of the content management module 102. The data maintained by the data store 118 can include, for example, content items, predetermined criteria to identify sensitive information, metadata associated with the content items, machine learning models, training data for the machine learning models, representations of content items, plots of content items in a feature space, etc. The data store 118 also can maintain other information associated with a social networking system. The information associated with the social networking system can include data about users, social connections, social interactions, locations, geo-fenced areas, maps, places, events, groups, posts, communications, content, account settings, privacy settings, and a social graph. The social graph can reflect all entities of the social networking system and their interactions. In some embodiments, the data store 118 can be a data store of a server system in communication with a user device.

The content protection module 152 can detect an event relating to generation of a copy of a content item on a user device. When generation of a copy of a content item is detected, the content protection module 152 can determine through metadata associated with the content item whether the content item is associated with sensitive information. If the content item is associated with sensitive information, the content protection module 152 can automatically modify the copy of the content item so that the sensitive information is obscured or eliminated. The content protection module 152 also can prevent access to the copy in its original form. In some embodiments, the content protection module 152 can be implemented in an application running on a user device in communication with a server system, such as a social networking system. In some embodiments, the data store 154 can be a memory of the user device. More details regarding the content protection module 152 are provided in relation to FIG. 2.

In some embodiments, the content management module 102 and the content protection module 152 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the content management module 102 and the content protection module 152 can be, in part or in whole, implemented as software running on one or more computing devices or systems, such as on a server system, a client computing device, or both. In some instances, the content management module 102 and the content protection module 152 can be, in part or in whole, implemented within or configured to operate in conjunction or be integrated with a social networking system (or service), such as a social networking system 630 of FIG. 6. Likewise, in some instances, the content management module 102 and the content protection module 152 can be, in part or in whole, implemented within or configured to operate in conjunction or be integrated with a client computing device, such as the user device 610 of FIG. 6. For example, the content management module 102 and the content protection module 152, in whole or in part, can be implemented as or within a dedicated application (e.g., app), a program, or an applet running on a client computing device. The application incorporating or implementing instructions for performing functionality of the content management module 102 and the content protection module 152 can be created by a developer. The application can be provided to or maintained in a repository. In some cases, the application can be uploaded or otherwise transmitted over a network (e.g., Internet) to the repository. For example, a computing system (e.g., server) associated with or under control of the developer of the application can provide or transmit the application to the repository. The repository can include, for example, an "app" store in which the application can be maintained for access or download by a user. In response to a command by the user to download the application, the application can be provided or otherwise transmitted over a network from the repository to a computing device associated with the user. For example, a computing system (e.g., server) associated with or under control of an administrator of the repository can cause or permit the application to be transmitted to the computing device of the user so that the user can install and run the application. The developer of the application and the administrator of the repository can be different entities in some cases, but can be the same entity in other cases. It should be understood that many variations are possible.

Figure 2:
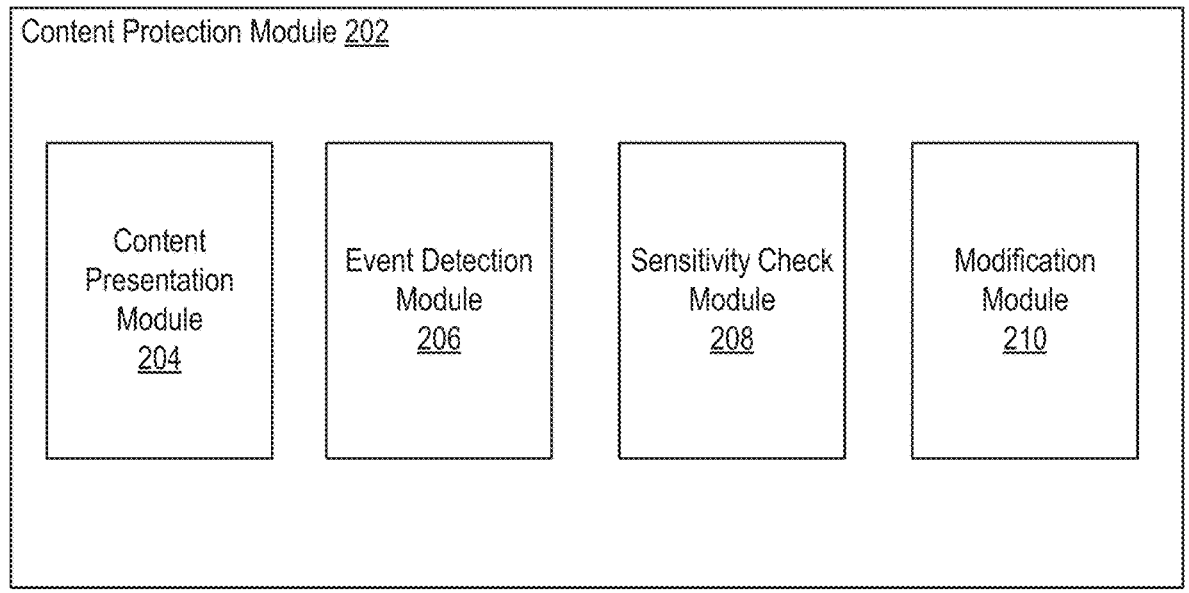
FIG. 2 illustrates an example content protection module, according to an embodiment of the present technology.

FIG. 2 illustrates an example content protection module 202 configured to protect sensitive information in content items, according to an embodiment of the present technology. In some embodiments, the content protection module 152 of FIG. 1 can be implemented with the content protection module 202. As shown in the example of FIG. 2, the content protection module 202 can include a content presentation module 204, an event detection module 206, a sensitivity check module 208, and a modification module 210.

The content presentation module 204 can present content items to a user. The content items along with their metadata can be provided to the content presentation module 204 from a server system, such as a social networking system. In some embodiments, the content items can be presented to a user through an interface of an application of the social networking system running on a user device. The application can support presentation of the content items in various platforms, surfaces, or feeds of the social networking system. In some embodiments, the content presentation module 204 can monitor various aspects of content item presentation on the user device. For example, the content presentation module 204 can determine which content items are presented through the interface of the user device. Further, the content presentation module 204 can determine timestamps indicating when the content items were presented through the interface. The timestamps can be expressed in units of time reflecting a relatively high degree of accuracy and precision (e.g., microseconds).

The event detection module 206 can detect an event relating to generation of a copy of a content item. An event can be any predetermined action involving creation of a partial or complete copy of a content item. In some embodiments, the event can be generation of a screenshot of an interface of a user device through which a content item appears. The screenshot can be saved to a location of a data store (or memory) of the user device. In other embodiments, the event can be any other action involving copying of a content item. The event detection module 206 can in real (or near real) time detect occurrence of an event, such as a screenshot capture, and a timestamp of the event through communication with a resource. For example, the resource can be an operating system of the user device that supports or manages capture of a screenshot of an interface of the user device. As another example, the resource can be an application installed on the user device that can detect that a screenshot of an interface of the user device has been captured. The event detection module 206 can communicate with the resource to determine occurrence of an event, such as capture of a screenshot, and a time of the event, such as a timestamp of the screenshot capture. The time can be expressed in units of time reflecting a relatively high degree of accuracy and precision (e.g., microseconds).

The sensitivity check module 208 can determine whether a detected event involves a content item associated with sensitive information. The sensitivity check module 208 can receive from the event detection module 206 an indication that an event has occurred and a time of the event. Based on the time of the event, the sensitivity check module 208 can identify which content item(s), if any, were involved in the event. For example, with respect to an event relating to a screenshot capture on a user device, the sensitivity check module 208 can identify content items that appear in the screenshot. The sensitivity check module 208 can perform this identification based on, for example, information relating to which content items appeared in the interface of the user device at the time of the event. Such information can be provided by the content presentation module 204 or another module or resource that monitors presentation of content items through the interface of the user device and timestamps associated with such presentation. The sensitivity check module 208 then can determine whether the identified content items are associated with sensitive information. If metadata associated with the identified content items indicates that a content item is associated with sensitive information, the sensitivity check module 208 can determine that the content item is associated with sensitive information.

The modification module 210 can apply protective measures to content items that have been determined to be associated with sensitive information. In some embodiments, when an event relates to a screenshot of an interface of a user device, the modification module 210 can retrieve the screenshot from a location where the screenshot is maintained in a data store (or memory) of the user device. The modification module 210 can modify the screenshot or, in particular, a content item appearing in the screenshot so that sensitive information appearing therein is no longer discernable. In some embodiments, the modification module 210 can apply a known blurring technique to obscure the sensitive information so that it cannot be discerned. In other embodiments, the modification module 210 can apply a known content editing technique to remove the sensitive information. After modification of the screenshot to obscure or eliminate the sensitive information, the modification module 210 can overwrite (or replace) the screenshot in its original form with the modified screenshot at the location where the original screenshot was maintained in the data store. Accordingly, the modification module 210 can prevent further access by a user to the original screenshot that included content items having sensitive information. When the user attempts to retrieve the screenshot, only the modified screenshot with obscured or eliminated sensitive information can be accessed.

The modification module 210 can selectively modify a screenshot. In some embodiments, the modification module 210 can obscure or eliminate all of a screenshot in which one or more content items associated with sensitive information appear. In some embodiments, the modification module 210 can obscure or eliminate a portion of such a screenshot. For example, the modification module 210 can obscure or eliminate only portions of a screenshot where sensitive information appears. In one implementation, the modification module 210 can determine a location of sensitive information in a content item. As referenced, metadata associated with the content item can include the location of the sensitive information in relation to the content item. Based on the location, the modification module 210 can modify the screenshot at the location of the sensitive information while leaving unmodified other portions of the screenshot. In some embodiments, an indication (e.g., explanation) can be added to the modified screenshot to indicate that the screenshot or a content item in the screenshot has been obscured for a protective purpose. Many variations are possible.

Figure 3:
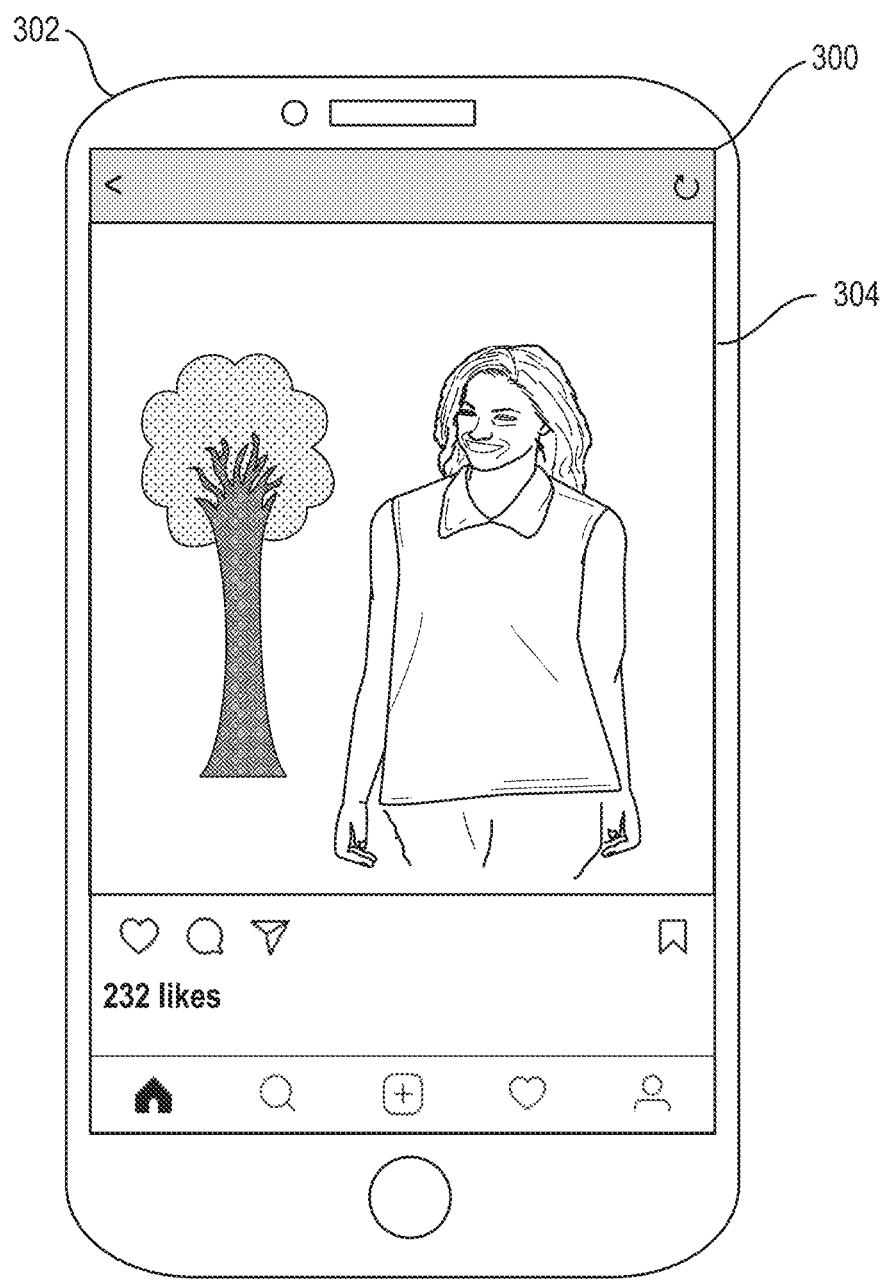
FIGS. 3-4B illustrate example user interfaces for protecting sensitive information, according to an embodiment of the present technology.
Figure 4A:
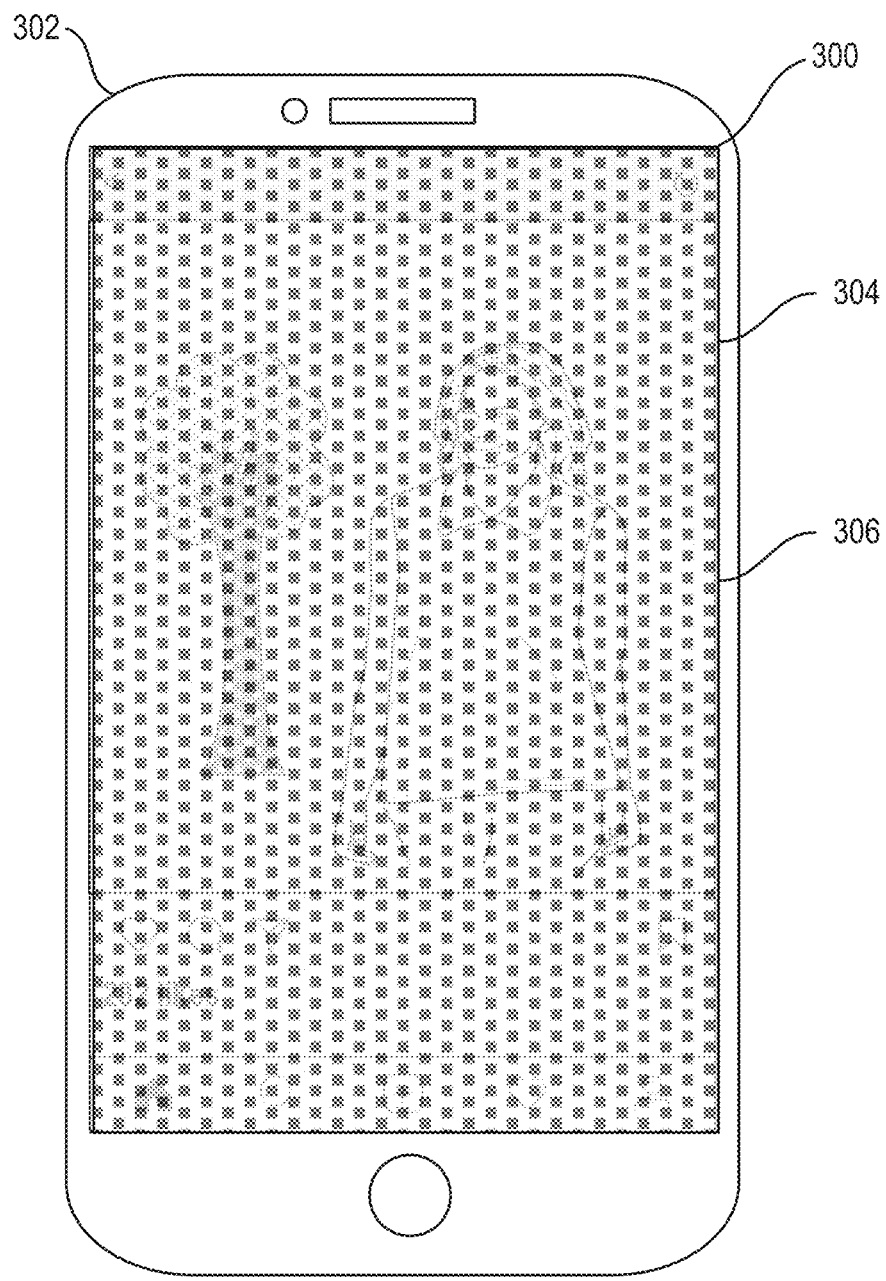
Figure 4B:
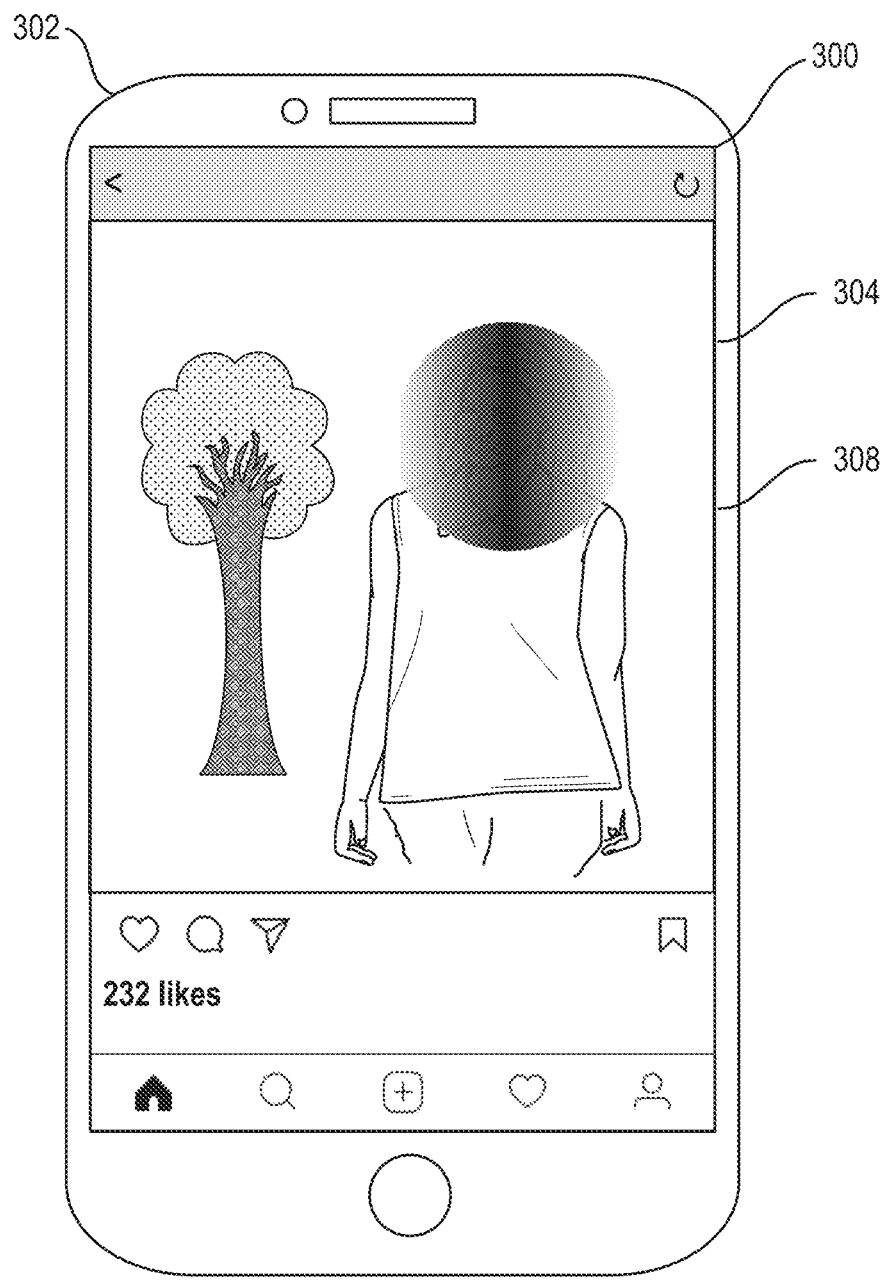

FIGS. 3-4B illustrate example interfaces reflecting protection of sensitive information associated with content items, according to embodiments of the present technology. As shown in FIG. 3, an interface 300 is presented on a user device 302 of a user. For example, the interface 300 can be provided by an application of a social networking system running on the user device 302. A content item 304 is presented through the interface 302. If the application determines that a predetermined event, such as capture of a screenshot of the interface 300, has occurred, the present technology can protect sensitive information associated with content items appearing in the screenshot. Metadata of content items included in the screenshot can be checked to determine if the content items are associated with sensitive information. In this example, it is determined that the content item 304 is associated with sensitive information. As a result, the screenshot of the interface 300 is modified to obscure or eliminate the sensitive information. The original screenshot can be overwritten in memory by the modified screenshot so that attempts to retrieve the screenshot on the user device 302 result only in access to the modified screenshot. Accordingly, access to the original screenshot is eliminated and access to the modified screenshot is permitted. In some cases, the entirety of the screenshot including the content item 304 can be obscured. In this regard, retrieval of the screenshot results in presentation of a modified screenshot 306 that is entirely obscured, as shown in FIG. 4A. In other cases, only portions of the screenshot displaying sensitive information are selectively obscured. In this regard, retrieval of the screenshot results in presentation of a modified screenshot 308 that is partially obscured as to the sensitive information, as shown in FIG. 4B. While the foregoing discussion relates to various examples, many variations of the present technology are possible.

Figure 5A:
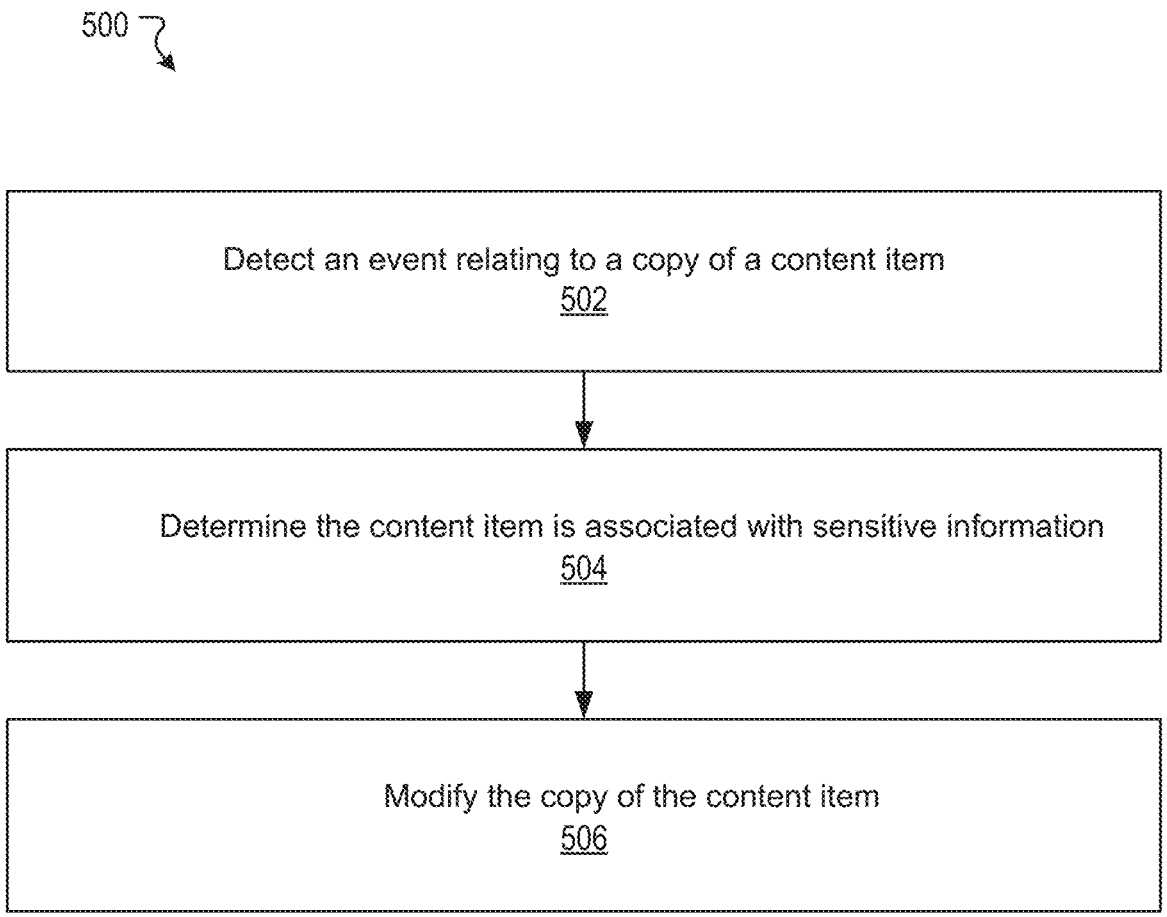
FIG. 5A illustrates an example first method for protecting sensitive information, according to an embodiment of the present technology.

FIG. 5A illustrates an example first method 500 for protecting sensitive information associated with a content item, according to an embodiment of the present technology. It should be understood that there can be additional, fewer, or alternative steps performed in similar or alternative orders, or in parallel, based on the various features and embodiments discussed herein unless otherwise stated.

At block 502, the example method 500 can detect an event relating to a copy of a content item. At block 504, the example method 500 can determine the content item is associated with sensitive information. At block 506, the example method 500 can modify the copy of the content item. Other suitable techniques that incorporate various features and embodiments of the present technology are possible.

Figure 5B:
FIG. 5B illustrates an example second method for protecting sensitive information, according to an embodiment of the present technology.

FIG. 5B illustrates an example second method 550 for protecting sensitive information associated with a content item, according to an embodiment of the present technology. It should be understood that there can be additional, fewer, or alternative steps performed in similar or alternative orders, or in parallel, based on the various features and embodiments discussed herein unless otherwise stated.

At block 552, the example method 550 can eliminate access to a copy of a content item. At block 554, the example method 550 can provide access to a modified copy of the content item. Other suitable techniques that incorporate various features and embodiments of the present technology are possible.

It is contemplated that there can be many other uses, applications, features, possibilities, and/or variations associated with various embodiments of the present technology. For example, users can, in some cases, choose whether or not to opt-in to utilize the disclosed technology. The disclosed technology can, for instance, also ensure that various privacy settings, preferences, and configurations are maintained and can prevent private information from being divulged. In another example, various embodiments of the present technology can learn, improve, and/or be refined over time.

Social Networking System—Example Implementation

Figure 6:
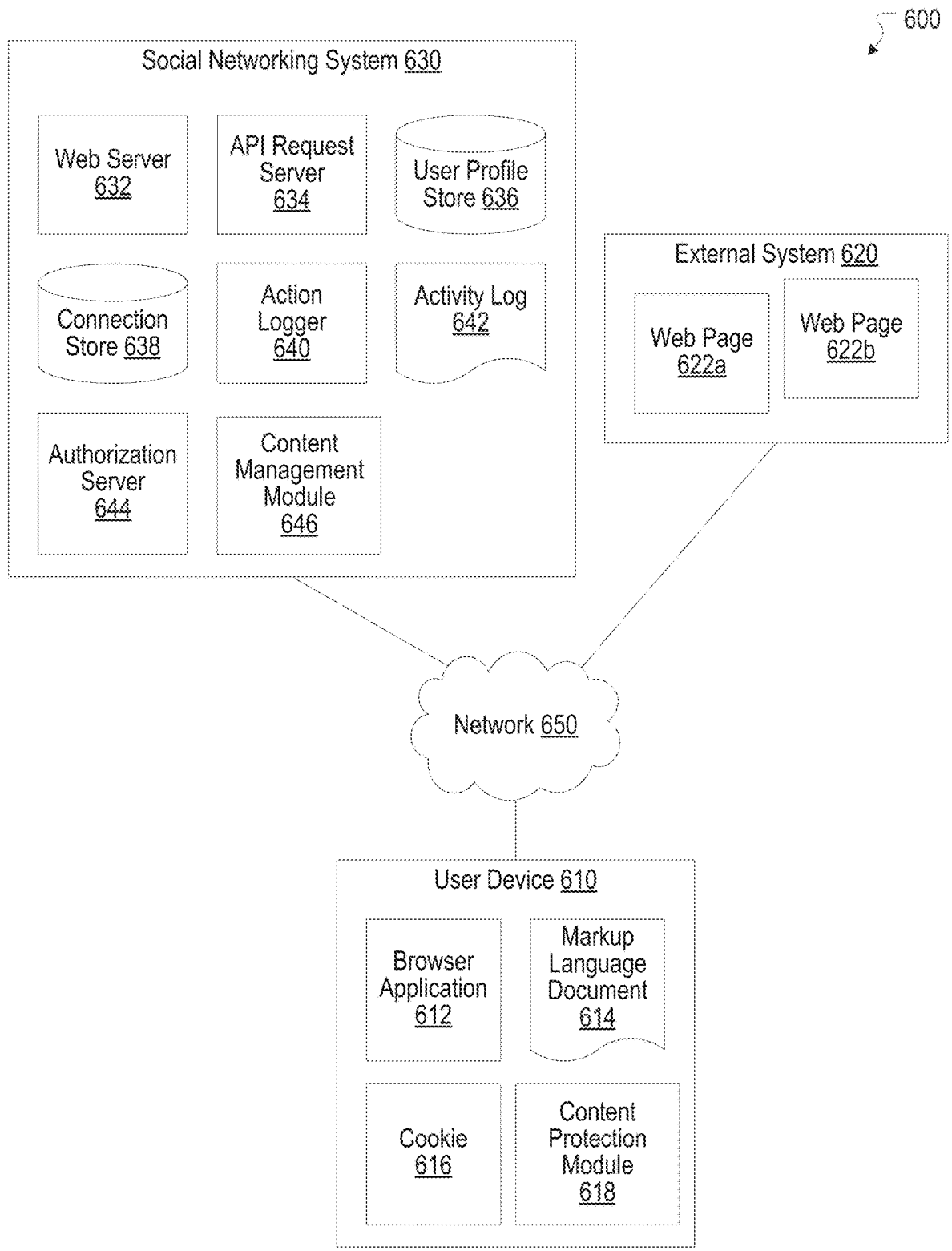
FIG. 6 illustrates a network diagram of an example system that can be utilized in various scenarios, according to an embodiment of the present technology.

FIG. 6 illustrates a network diagram of an example system 600 that can be utilized in various scenarios, in accordance with an embodiment of the present technology. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a device having computer functionality, such as a smart-phone, a tablet, a personal digital assistant (PDA), a mobile telephone, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the SilverLight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries.

When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a content management module 646. The content management module 646 can be implemented with the content management module 102, as discussed in more detail herein. In some embodiments, the user device 610 can include a content protection module 618. The content protection module 618 can be implemented with the content protection module 152, as discussed in more detail herein. In some embodiments, one or more functionalities of the content management module 646 can be implemented by the user device 610.

Hardware Implementation

Figure 7:
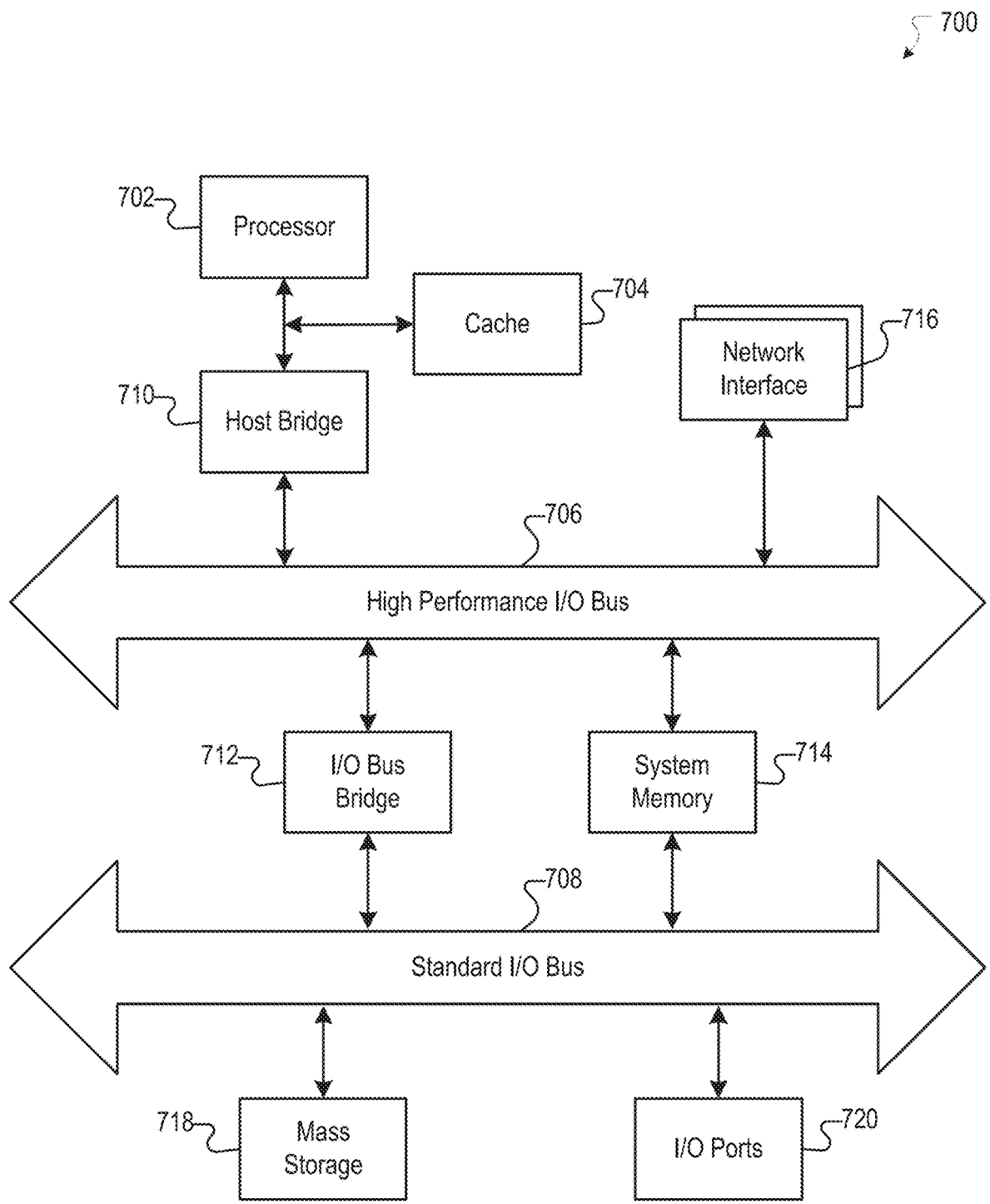
FIG. 7 illustrates an example of a computer system that can be utilized in various scenarios, according to an embodiment of the present technology.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 720, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer implemented method comprising:
providing, by a computing system, a content item provided by a first user associated with a first user device to a feed accessible by a second user associated with a second user device, wherein the content item is associated with timestamps that indicate when the content item was presented on a user interface of the second user device;
detecting, by the computing system, an event associated with generation of a copy of the content item by the second user on the second user device based on the timestamps;
determining, by the computing system, the content item is associated with sensitive information; and
modifying, by the computing system, the copy of the published content item.

2. The computer-implemented method of claim 1, wherein the event is generation of a screenshot of athe user interface presenting the published content item.

3. The computer-implemented method of claim 1, wherein the content item is associated with metadata indicating a presence of the sensitive information.

4. The computer-implemented method of claim 3, wherein the metadata further indicates a location of the sensitive information in the content item.

5. The computer-implemented method of claim 1, wherein the detecting the event comprises:
determining that the content item was presented in athe user interface at a time of the event.

6. The computer-implemented method of claim 1, further comprising:
overwriting in memory the copy of the content item with the modified copy.

7. The computer-implemented method of claim 1, wherein the event is generation of a screenshot of the user interface presenting the content item and wherein the modifying the copy of the content item comprises:
obscuring at least a portion of the screenshot.

8. The computer-implemented method of claim 7, wherein the at least a portion of the screenshot includes the sensitive information.

9. The computer-implemented method of claim 1, further comprising:
eliminating access to the copy of the content item; and
providing access to the modified copy of the content item.

10. The computer-implemented method of claim 1, wherein the modifying the copy of the content item is based on an opt in by the first user.

11. A system comprising:
at least one hardware processor; and
a memory storing instructions that, when executed by the at least one processor, cause the system to perform:
providing a content item provided by a first user associated with a first user device to a feed accessible by a second user associated with a second user device, wherein the content item is associated with timestamps that indicate when the content item was presented on a user interface of the second user device;
detecting an event associated with generation of a copy of the content item by the second user on the second user device based on the timestamps;
determining the content item is associated with sensitive information; and
modifying the copy of the content item.

12. The system of claim 11, wherein the event is generation of a screenshot of athe user interface presenting the content item.

13. The system of claim 11, wherein the content item is associated with metadata indicating a presence of the sensitive information.

14. The system of claim 13, wherein the metadata further indicates a location of the sensitive information in the content item.

15. The system of claim 11, wherein the detecting the event comprises:
determining that the content item was presented in the user interface at a time of the event.

16. A non-transitory computer readable medium including instructions that, when executed by at least one hardware processor of a computing system, cause the computing system to perform a method comprising:
providing a content item provided by a first user associated with a first user device to a feed accessible by a second user associated with a second user device, wherein the content item is associated with timestamps that indicate when the content item was presented on a user interface of the second user device;
detecting an event associated with generation of a copy of the content item by the second user on the second user device;
determining the content item is associated with sensitive information; and
modifying the copy of the content item.

17. The non-transitory computer readable medium of claim 16, wherein the event is generation of a screenshot of the user interface presenting the content item.

18. The non-transitory computer readable medium of claim 16, wherein the content item is associated with metadata indicating a presence of the sensitive information.

19. The non-transitory computer readable medium of claim 18, wherein the metadata further indicates a location of the sensitive information in the content item.

20. The non-transitory computer readable medium of claim 16, wherein the detecting the event comprises:
determining that the content item was presented in the user interface at a time of the event.

* * * * *